United States Patent Office 2,735,982
Patented Feb. 21, 1956

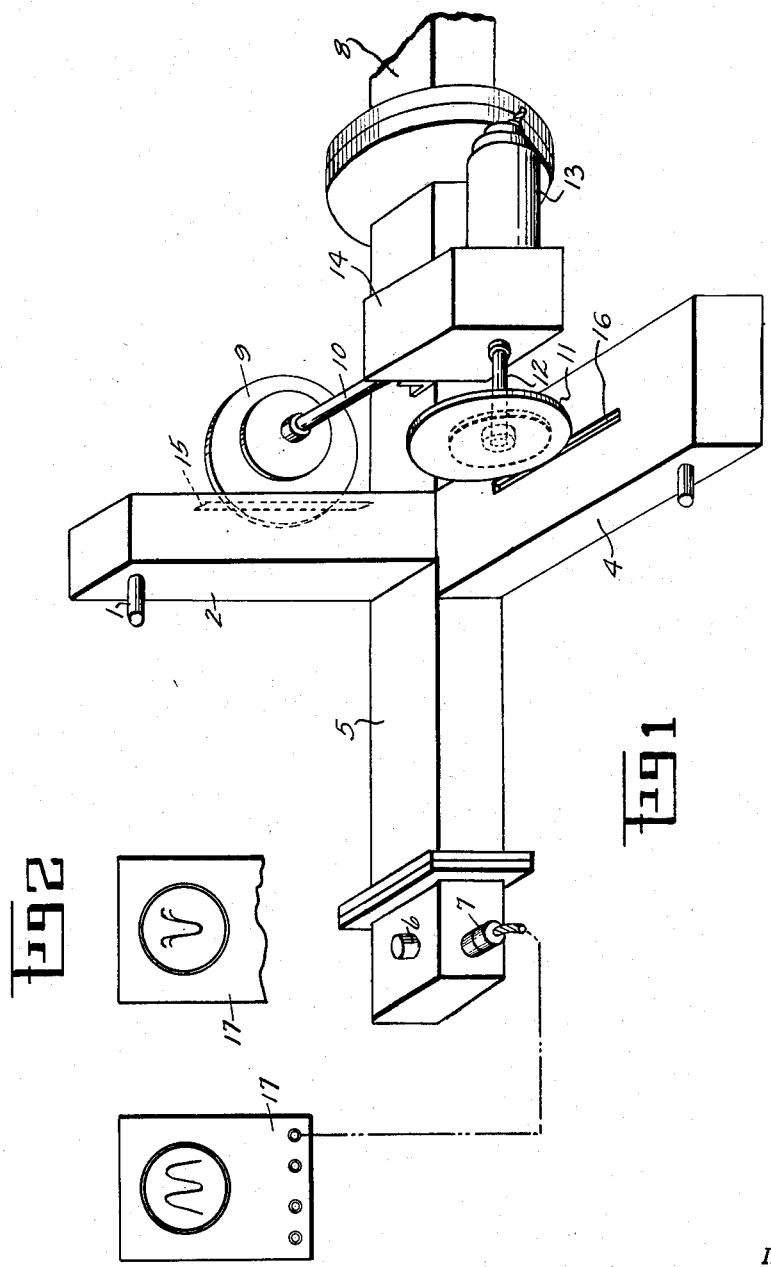

2,735,982

RADIO FREQUENCY POWER COMPARATOR

Kenneth C. C. Gunn, Concord, and Kenneth O. Holmes, Natick, Mass., assignors to the United States of America as represented by the Secretary of the Air Force Application December 14, 1951, Serial No. 261,736

3 Claims. (Cl. 324—95)

(Granted under Title 35, U. S. Code (1952), sec. 266)

This invention relates to a novel device for comparing the relative amplitudes of radio frequency waves.

In the art of comparing the power of one radio frequency wave with another radio frequency wave, it is essential that small differences in the order of fractions of a decibel be detected and that these waves be compared substantially instantaneously and sometimes constantly.

It is an object of this invention to provide a radio frequency power comparator which will detect extremely small differenecs in the powers to be compared.

It is another object of this invention to provide a radio frequency power comparator which will indicate the relative magnitude of the powers instantaneously and constantly.

The above object as well as other objects, features and advantages of the present invention will be more clearly understood in view of the following description when taken in conjunction with the drawing wherein—

Figure 1 is a perspective view of one form of a radio frequency power comparator embodying the principles of this invention, and Figure 2 illustrates the screen of the cathode ray oscilloscope showing the trace produced when the sweep frequency is twice the frequency of the waves under observation.

Referring now to the drawing, and more particularly to Figure 1 thereof, the input terminal 1, to which one of the radio frequency waves to be compared is applied, is connected with the wave guide section 2 and the input terminal 3, to which the other radio frequency wave to be compared is applied, is connected with the wave guide section 4. The wave guide sections 2 and 4 form the two branch arms of a main wave guide section 5 having a crystal detector 6 and output terminal 7 at one end thereof and a load and impedance matching section 8 at the other end thereof.

The branch wave guide sections 2 and 4 and the main wave guide section 5 make up a hybrid circuit oftentimes referred to as a hybrid tee.

The wave guide section 2 has a variable attenuator consisting of a plate 9 containing resistive material and that plate is eccentrically mounted on shaft 10. The wave guide section 4 has a variable attenuator 11 consisting of resistive material and that plate is eccentrically mounted on shaft 12. The two shafts 10 and 12 are driven by an electric motor 13 through a suitable gearing box 14. The plates 9 and 11 are mounted on their respective shafts 10 and 12 so that these plates rotate 180° out of phase with each other.

From the above description it will be apparent that when two radio frequency waves to be compared are applied to the input terminals 1 and 3 and the motor 13 is energized, those waves will be modulated in amplitude by their respective plates 9 and 11 and therefore the output of the crystal detector 6 will produce first a voltage directly related to the power of the wave applied to one input terminal and then will produce a voltage directly related to the power of the wave applied to the other input terminal. The voltage output of the crystal detector will have a wave shape dependent upon the dimensions and configuration of the plates 9 and 11.

In a preferred embodiment of this invention, the plates 9 and 11 were constructed to have a plate shape, that is, circular faces and uniform cross section, however, it will be understood that the plates 9 and 11 may have any desired shape that will produce the necessary wave form.

The output of the crystal detector 6 which appears at the output terminal 7 is preferably applied to the deflecting coil of a cathode ray oscilloscope 17. The output of the crystal detector 6 will then cause the beam of the cathode ray oscilloscope to be deflected as shown in Figure 1 which shows a wave form having a series of peaks. The amplitude of the first peak will be determined by the power of the signal applied to one of the input terminals and the amplitude of the second peak will be determined by the power of the wave applied to the other input terminal. It is obvious that the sweep frequency of the cathode ray oscilloscope can be adjusted so that only two peaks are produced or as many as desired may be produced. If the sweep frequency is adjusted to twice the frequency of the plates 9 and 11 the two wave forms will be superimposed as shown in Figure 2. One of these wave forms will have its amplitude determined by the power of the wave applied at one input terminal and the other wave form will have its amplitude determined by the power of the wave applied to the other input terminal.

The attenuator plates 9 and 11 are so adjusted that they will produce equal attenuation at their maximum attenuation position by conventional methods such as with a spectrum analyzer.

The invention described in the foregoing specification and claims may be manufactured and used by or for the Government for governmental purposes, without the payment to us of any royalty thereon.

What is claimed is:

1. A radio frequency power comparator comprising a first input circuit having a first cyclically variable dissipative attenuator therein, a second input circuit having a second similar cyclically variable dissipative attenuator therein, coupling means between said attenuators for establishing an inverse phase relation between their attenuation cycles, said attenuators permitting the simultaneous passage of power over at least a portion of their cycle of operation, a common output circuit having a radio frequency detector coupled thereto, a hybrid circuit connected between said input circuits and said output circuit for coupling said input circuits to said output circuit and for preventing the transfer of energy between said input circuits, and means for indicating the output of said detector along a time axis.

2. Apparatus as claimed in claim 1 in which said hybrid circuit is a magic-T consisting of a first rectangular waveguide having said detector coupled to one end and a load and impedance matching device coupled to the other end, a second rectangular waveguide making an E-plane T-junction with said first waveguide at a point equidistant from its ends, and a third rectangular waveguide making an H-plane T-junction with said first waveguide at said equidistant point, said second and third waveguides constituting said input circiuts.

3. A radio frequency power comparator comprising a first rectangular waveguide having a crystal detector coupled to one end and a load and impedance matching device coupled to the other end, a second rectangular waveguide making an E-plane T-junction with said first waveguide at a point equidistant from its ends, a third rectangular waveguide making an H-plane T-junction with said first waveguide at said equidistant point, a dissipative attenuator associated with said second waveguide consisting of a radio frequency power dissipating element and means for cyclically moving said element from a first position wholly outside said second waveguide to a second position in which a predetermined amount of said element is within said waveguide and back to said first position, a similar attenuator similarly associated with said third waveguide, a coupling between said attenuators for introducing an inverse phase relation between their cycles of operation, said attenuators permitting the simultaneous passage of power over at least a portion of their cycle of operation, means for applying radio frequency energy to be compared to said second and third waveguides, and means for indicating the output of said crystal detector along a time axis.

References Cited in the file of this patent

UNITED STATES PATENTS

| | | |
|---|---|---|
| 2,244,756 | Alford | June 10, 1941 |
| 2,426,992 | Folland et al. | Sept. 9, 1947 |
| 2,430,568 | Hershberger | Nov. 11, 1947 |
| 2,505,557 | Lyman | Apr. 25, 1950 |
| 2,532,817 | Lafferty et al. | Dec. 5, 1950 |
| 2,534,624 | Posthumus | Dec. 19, 1950 |
| 2,545,994 | Gabler et al. | Mar. 20, 1951 |
| 2,562,958 | Smullin et al. | Aug. 7, 1951 |
| 2,564,300 | Culver et al. | Aug. 14, 1951 |
| 2,576,943 | Jenks | Dec. 4, 1951 |
| 2,593,113 | Cutler | Apr. 15, 1952 |
| 2,596,531 | Clarke | May 13, 1952 |
| 2,602,157 | Hamilton | July 1, 1952 |
| 2,628,308 | Norton | Feb. 10, 1953 |